(12) United States Patent  (10) Patent No.: US 7,395,042 B2
Alder  (45) Date of Patent: Jul. 1, 2008

(54) ENHANCING SIGNALS IN A TWO-WAY RADIO SYSTEM

(75) Inventor: Lawrence Alder, Mountain View, CA (US)

(73) Assignee: Durham Logistics, LLC, Las Vegas, NV (US)

( * ) Notice: Subject to any disclaimer, the term of this patent is extended or adjusted under 35 U.S.C. 154(b) by 0 days.

(21) Appl. No.: 11/469,015

(22) Filed: Aug. 31, 2006

(65) Prior Publication Data

US 2007/0049226 A1 Mar. 1, 2007

Related U.S. Application Data

(63) Continuation of application No. 10/483,259, filed on Jul. 7, 2006, which is a continuation of application No. 10/260,785, filed on Sep. 27, 2002, now Pat. No. 7,096,051.

(51) Int. Cl.
*H04B 1/10* (2006.01)

(52) U.S. Cl. ............... 455/218; 455/701; 455/222; 455/205; 375/216; 375/229

(58) Field of Classification Search ............... 455/701, 455/210–212, 218–225, 45, 702, 703, 102, 455/110, 228, 59, 70, 562.1, 63.4, 69, 420, 455/296, 850, 68, 150.1, 205, 134, 135, 179.1; 375/216, 229, 285, 346, 350
See application file for complete search history.

(56) References Cited

U.S. PATENT DOCUMENTS

| 4,541,118 | A | * | 9/1985 | Eastmond et al. | ............ 455/701 |
| 5,583,885 | A | * | 12/1996 | Flynn et al. | ................. 455/701 |
| 6,771,988 | B2 | * | 8/2004 | Matsuoka et al. | ........ 455/562.1 |
| 6,804,511 | B1 | | 10/2004 | Kakinuma | |
| 6,850,188 | B1 | * | 2/2005 | Lee et al. | ............... 342/357.08 |

* cited by examiner

*Primary Examiner*—John J Lee
(74) *Attorney, Agent, or Firm*—Stolowitz Ford Cowger LLP

(57) ABSTRACT

Embodiments of the present invention can be used to enhance signals in a peer-to-peer radio system, such as a two-way radio system. In one embodiment, the invention includes receiving a communications signal on a channel from a remote radio at a radio using a plurality of antenna elements, such as an antenna array. The received communications signal includes a squelch code. The radio detects the squelch code, and enhances the received communications signal using the squelch code.

17 Claims, 3 Drawing Sheets

ENHANCING SIGNALS IN A TWO-WAY RADIO SYSTEM

CROSS-REFERENCE TO RELATED APPLICATIONS

This application is a continuation of U.S. patent application Ser. No. 11/483,259 filed Jul. 7, 2006, which is a continuation of U.S. patent application Ser. No. 10/260,785 filed Sep. 27, 2002, now issued as U.S. Pat. No. 7,096,051.

BACKGROUND OF THE INVENTION

1. Field of the Invention

The present invention applies to the field of wireless communications systems and, in particular, to two-way radio communications using squelch codes.

2. Description of the Prior Art

Personal Radio Service (PRS) is the name applied by the Federal Communications Commission Wireless Telecommunications Bureau to cover a broad array of two-way (or, walkie-talkie) type radio services. Included under the PRS moniker are radio services such as the so-called 218-219 MHz service, the Citizens Band (CB) radio service, the Family Radio Service (FRS), the General Mobile Radio Service (GMRS), the Low Power Radio Service (LPRS), the Medical Implant Communications Service (MICS), the Radio Control Radio Service, and the Wireless Medical Telemetry Service.

These "two-way" radios, sometimes referred to as walkie-talkies or handie-talkies, generally broadcast directly from one communications device (typically a portable radio) to another, or they may use a repeater to amplify their signals. These devices generally use allocated channelized spectrum. These channels can be frequency bands around a central carrier. For example, the spectrum allocated to FSR has been divided into fourteen (14) channels from 462.5625 MHz through 462.7125 MHz, and again from 467.5625 MHz through 467.7125 MHz, with each channel occupying a 30 KHz frequency band (see, e.g., 47 CFR §95.627).

Since anyone can use the allocated channels at any time, when a radio is tuned to a particular channel, a user can hear anyone who transmits on that channel. Also, if two people transmit simultaneously on a given channel, the radio frequency (RF) signals interfere with one another, and the listeners will likely hear noise. Thus, a user has to listen to the conversations of other parties with whom the user does not wish to communicate if these parties are using the same channel. Furthermore, if these other parties communicate simultaneously with the user, or with people the user wishes to communicate with, this will interfere with the users ability to communicate.

To address the problem of listening to the conversations of strangers, some manufacturers of such two-way communication devices enable the use of squelch codes. Squelch is the phrase used for muting a speaker. For example, two-way radios generally squelch the speaker until a minimum signal strength is detected, so that the radio is not constantly humming with background noise. By using squelch codes, the radio only un-squelches the speaker when it detects the squelch code. Examples of squelch codes are Continuous Tone Coded Squelch System (CTCSS) sub-audible tones which are out-of-band tones and Digital Coded Squelch (DCS) code words, which are digital squelch codes. Motorola's trademarked version of these squelch systems are called Private Line (PL)™ and Digital Private Line (PL)™ respectively.

As an example, FSR uses CTCSS to create "sub-channels." Each user selects which CTCSS tone to use in conjunction with a selected RF channel. The radio then blocks, i.e. squelches, any signal received that does not include the selected CTCSS tone. Thus, if two users select a CTCSS tone not used by other parties, then the two users will only hear transmissions from each other. However, the use of squelch codes does not solve the problem of interference. Two users transmitting on the same channel at the same time using different squelch codes will still interfere with one another, leaving the receiver unable to render the desired content.

BRIEF SUMMARY OF THE INVENTION

Embodiments of the present invention can be used to enhance signals in a peer-to-peer radio system, such as a two-way radio system. In one embodiment, the invention includes receiving a communications signal on a channel from a remote radio at a radio using a plurality of antenna elements, such as an antenna array. The received communications signal includes a squelch code. The radio detects the squelch code, and enhances the received communications signal using the squelch code.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

According to one embodiment of the invention, an enhanced FSR radio has an antenna array of two or more antennas. The radio can use the CTCSS tone or the DCS code word as a training signal to determine spatial processing parameters, such as receive weights, to null interferers transmitting simultaneously on the same channel.

Figure 1:
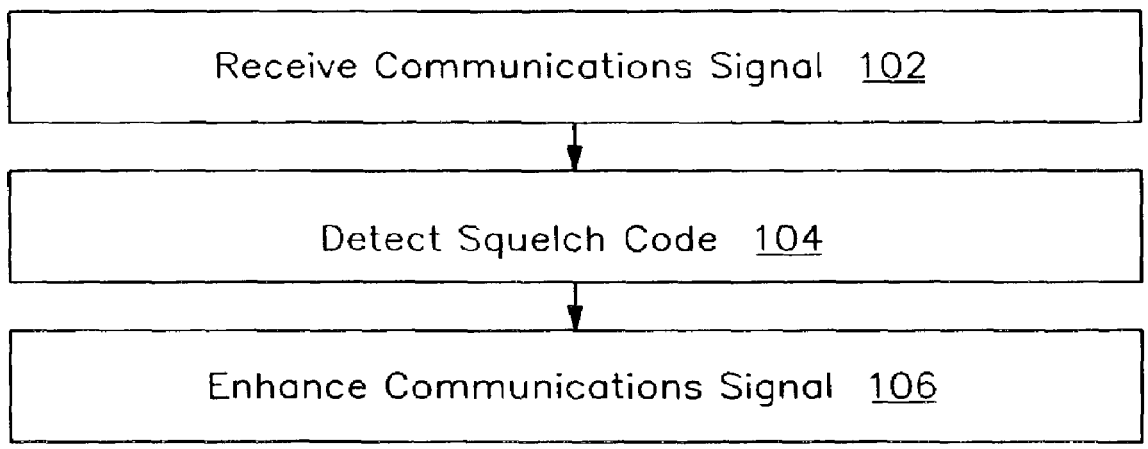
FIG. 1 is a flow chart of a process for enhancing a received communications signal in accordance with an embodiment of the invention.

One embodiment of the present invention is now described with reference to FIG. 1. In this example, the user of a two-way radio wishes to communicate with another party herein referred to as the desired party. The user of the two-way radio and the desired party agree on a channel to communicate on using their respective two-way radios. Furthermore, the user and the desired party agree on a sub-channel as marked by a squelch code. Both the selection of the channel and the squelch code can be manual or automatic.

First, the user's two-way radio receives 102 a communications signal from the desired party. The two-way radio uses two or more antennas, so the number of versions of the received signal equals the number of antenna elements used for reception. The communications signal may have been transmitted by the radio used by the desired party, or by a repeater in the area. The received communications signal includes the squelch code, since the user has agreed with the desired party on the squelch code.

The user's two-way radio detects 104 the squelch code, for example, by scanning for a reference version of the scan code. In one embodiment, the squelch code is used for its traditional purpose, and upon detecting the squelch code, the two-way radio un-squelches the speaker, since that is what the squelch code is designed for.

Furthermore, the two-way radio uses the squelch code to enhance 106 the received communications signal. In one embodiment, the two-way radio uses the squelch code as a training signal to enhance the received signal. A training signal, also known as a pilot signal or a training sequence, can be used for measuring channel parameters and characteristics, such as SNR (signal to noise ratio), SINR (signal to interference and noise ratio), spatial parameters, timing, and frequency offset. It can also be used for calibration, or the calculation of spatial processing parameters.

Thus, a training signal can be used to determine a spatial processing strategy, such as receive spatial processing weights. Training signals are useful because the received signal is known at the receiver and can therefore be compared with a reference signal that corresponds to the known sent signal. Since the user's two-way radio knows the squelch code, it can use it as a training signal.

In one embodiment of the present invention, the two-way radio uses the squelch code to determine a spatial processing strategy for combining the various versions of the signal as received through the various antenna elements. According to one such strategy, the known squelch code is used to determine a set of weights that generates a signal that most closely matches the known squelch code. In particular, the set of weights can be generated such that the correlation of the weighted sum of the received squelch code with a locally generated version of the squelch code is high. The set of weights can be complex valued weights representing a phase and amplitude adjustment to each version of the signal received though the corresponding antenna element.

For example, if the squelch code is a CTCSS tone and the two-way radio has two antenna elements, the two-way radio can adjust the relative phase and amplitude of signals from one antenna element to most closely match the CTCSS tone being received with the expected CTCSS tone. This can be done by a feedback loop designed to match two tones. Similarly, if the two-way radio receives a DCS code word, it can adjust the phase and amplitude of the versions of the signal to correlate the received DCS code word with the reference DCS code word selected by the user and the desired party.

Spatially processing the received communications signal can enhance the quality of the received signal even in the absence of severe interference. However, in the case of severe interference, such when receiving an interfering signal from an interfering party using the same channel as the user and the desired party (also known as cross-talk), spatially processing the received signals can mitigate the interference caused by the interfering signal. In one embodiment, the interfering signal is nulled so that the user hears only the signal sent by the desired party.

Two-Way Radio Structure

Figure 2:
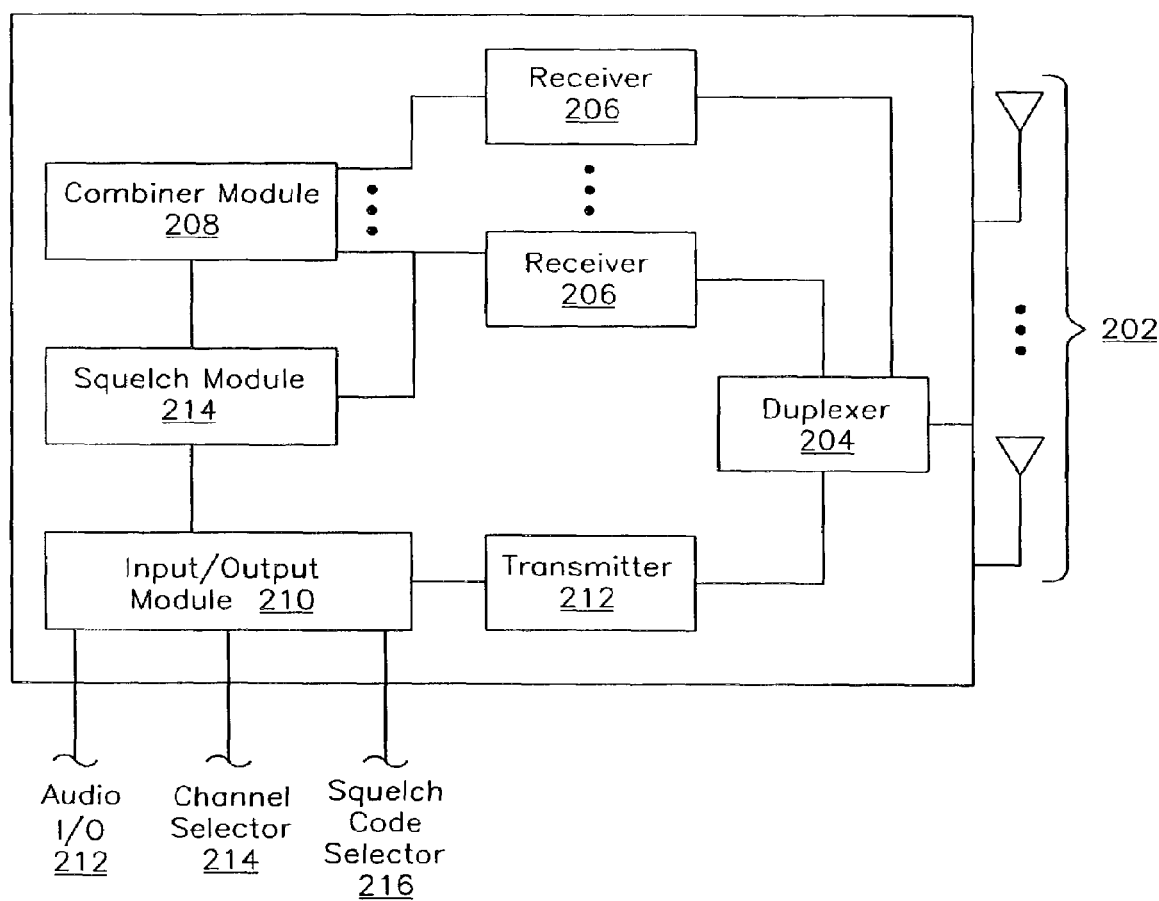
FIG. 2 is a simplified block diagram of a two-way radio on which an embodiment of the invention can be implemented.

FIG. 2 depicts an example component arrangement in a two-way radio 200. The two-way radio's 200 antenna elements 202 are connected to a duplexer 204 to permit the antenna elements 202 to be used for both transmission and reception. The dots between the antenna elements 202 symbolize that any number of antenna element greater than one can be used. Usually, in handie-talkie devices the duplexer 204 is controlled by a push-button. In one embodiment, when this push-button is activated the duplexer 204 is in transmit mode, otherwise the duplexer 204 is in receive mode. The duplexer outputs serves as inputs to receivers 206. The receivers 206 can perform down-converting, demodulation, analog-to-digital conversion, or other reception related tasks depending on implementation. For example, an analog FSR radio will not need analog-to-digital conversion.

The receiver signals serve as input for the combiner module. In one embodiment, the combiner module adjusts the phase and amplitude of the receiver signals using a set of receive weights determined by training on the squelch code. In one analog embodiment, the combiner module 208 can be implemented as a feedback circuit well known in the art that matches the expected squelch code, such as a CTCSS tone, and adjusts and combines the receiver signals accordingly. In one digital embodiment, the combiner module 208 can be implemented as a processor, such as a Motorola DSP56300 Family Digital Signal Processor, that correlates the received symbols with the expected digital squelch code, such as a DCS code word, to determine receive weights. The calculation of receive weights is described, for example, in U.S. Pat. No. 5,828,658, issued Oct. 27, 1998 to Ottersten et al. and U.S. Pat. No. 5,642,353, issued Jun. 24, 1997 to Roy, III et al.

The signal produced by the combiner module 208 is input for the Input/Output Module 210. In one embodiment, the Input/Output Module 210 controls Audio I/O 212, such as a microphone for audio input and a speaker for audio output. The Input/Output module 210 can further operate a Channel Selector 214 used by a user to select the channel, such as one of the fourteen FSR frequency bands, for communication with a desired party. The Input/Output Module 210 can also operate a Squelch Code Selector 214 used by the user to select the squelch code used by the desired party. The Squelch Code Selector 214 can be implemented, for example, as a CTCSS selector or a DCS selector. In one embodiment, the Squelch Code Selector 214 can allow for both manual and automated selection of a squelch code. The Input/Output Module 210 can operate other i/o devices, such as displays, keyboards, and various knobs and buttons, such as the duplexer button discussed above.

The two-way radio 200 also includes a transmitter 212 for transmitting signals through one or more of the antenna elements 202. In one embodiment, only one antenna is used for omni-directional transmission, and thus only one transmitter 212 is needed. However, other embodiments can use multiple antenna elements 202 and multiple transmitters 212 to transmit in a directional manner. In one such embodiment, the transmitter is also coupled to the Combiner Module 208 that can determine and apply transmit weights to the signal to be transmitted. In one embodiment, the signal to be transmitted is voice from a microphone, and the transmitter 212 performs modulation and up-conversion. In an alternate embodiment, the signal is digitized voice data, and the transmitter 212 also performs digital to analog conversion.

In one embodiment, the two-way radio 200 also includes a Squelch Module 214. The Squelch Module 214 is pictured as a separate module, but can be implemented as part of the Combiner Module 208. The Squelch Module 214 detects the squelch code selected using the Squelch Code Selector 216 and un-squelches the Audio I/O 212, e.g. a speaker, in response.

Demonstrative Example

Figure 3:
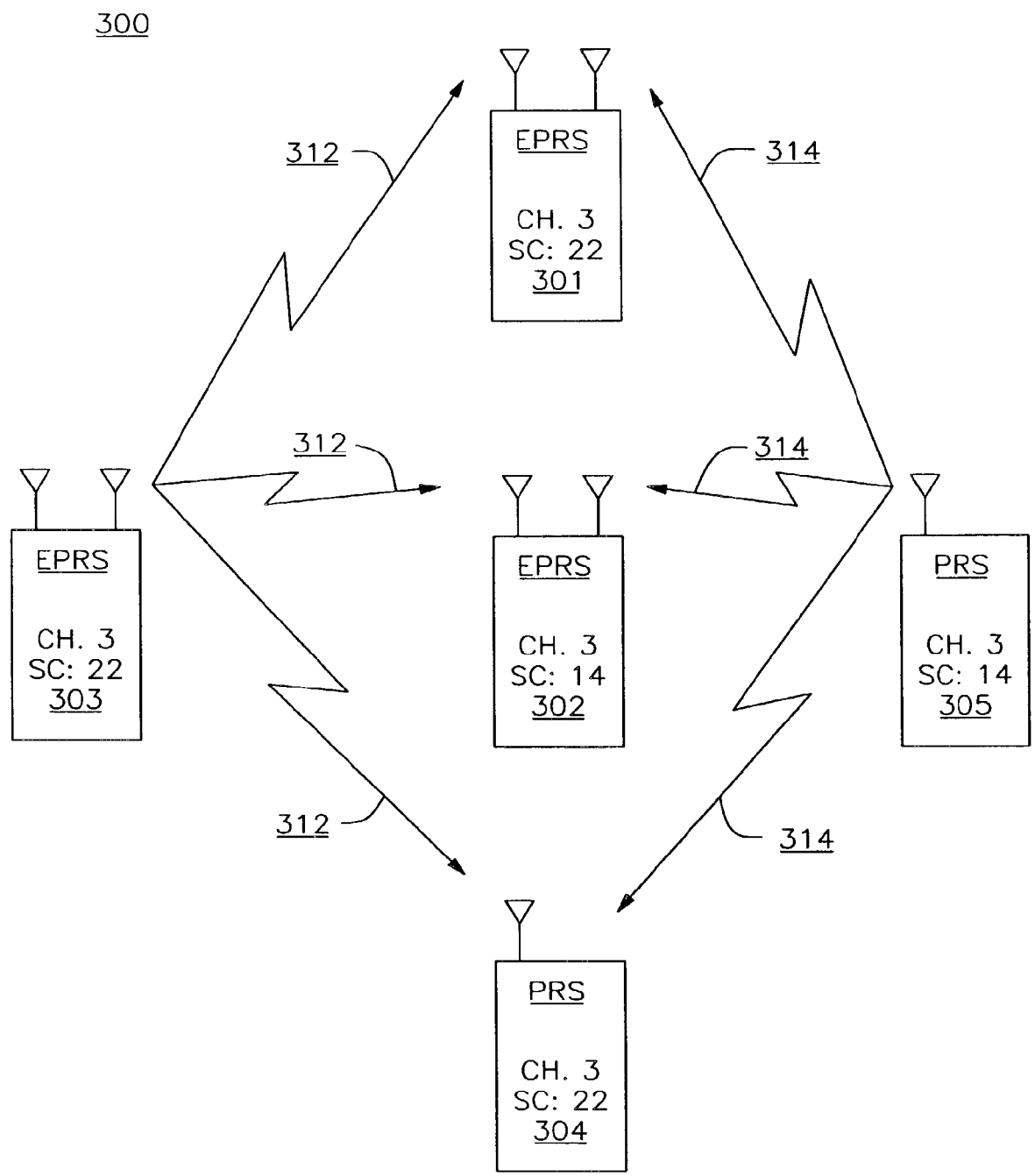
FIG. 3 is a simplified block diagram of a peer-to-peer communications environment in which embodiments of the invention can be practiced.

FIG. 3 is a block diagram of an example operating environment within which example embodiments of the present invention may be practiced. As depicted in FIG. 3, a personal radio services (PRS) communication environment 300 is depicted as including wireless communication devices 301-305. PRS devices 301-303 are labeled as Enhanced PRS (EPRS) communication devices to show that an embodiment of the present invention is implemented in these devices. The PRS communications environment 300 also includes legacy PRS units 304 and 305. In accordance with the illustrated example embodiment, EPRS 303 and PRS 305 are each broadcasting on a user-selected communication channel and squelch code. According to the illustrated example embodiment, each of the transmitting devices 303 and 305 are broadcasting on the same communication channel, channel 3, denoted as signals 312 and 314, respectively. In this regard, conventional PRS communication devices, e.g., PRS device 304, will not receive either of the broadcast signals 312 or 314 as simultaneous communication over the same communication channel generates too much interference from which the conventional PRS device 304 is often unable to recover a usable signal.

In contrast, an EPRS device 301 operating in the same environment and tuned to the communication channel and using the appropriate squelch code (e.g., Ch. 3, squelch code 22) will still receive and render the signal of interest 312 using spatial processing. The architecture of the EPRS can be fully compatible with legacy PRS communication devices. That is, since the spatial processing is carried out in the receiver, an EPRS communications device will operate as described above regardless of whether the transmitting device is an EPRS device or a conventional PRS device. Such compatibility with legacy PRS devices is particularly illustrated with reference to EPRS 302 and PRS 305 in FIG. 3.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIG. 2, or may be embodied in machine-executable instructions, which may be used to cause a general-purpose or special-purpose processor or logic circuits programmed with the instructions to perform the steps. Alternatively, the steps may be performed by a combination of hardware and software. The present invention is described in the context of a peer-to-peer wireless network of two-way radios, such as FSR. However, the present invention may be implemented in other networks, and in peer-to-peer networks that also use repeaters, such as GMRS. These two-way radios may be implemented in various devices, such as handie-talkies, cellular phones, PDA's, laptop computers, or any other wireless devices. Generally, since these devices use radio waves, they may be generally referred to as radios.

Embodiments of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatuses are described in their most basic form, but steps or components can be added to or deleted from any of the methods and apparatuses without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method adapted for use in a receiver including a plurality of antenna elements, the method comprising:
   detecting a squelch code in a first signal; and
   enhancing a response of the receiver to said first signal in response to at least the squelch code by substantially nulling an interfering signal appearing on a same channel as the first signal;
   wherein said substantially nulling the interfering signal comprises spatial processing by determining a set of spatial processing weights using the squelch code and combining the first signal according to the set of spatial processing weights; and
   wherein the set of spatial processing weights is configured to represent at least one of a phase and amplitude adjustment of the first signal.

2. The method of claim 1, wherein combining the first signal according to the set of spatial processing weights includes combining the first signal according to the set of spatial processing weights to provide a combined signal related to the first signal.

3. The method of claim 1, wherein squelch code comprises a Continuous Tone Coded Squelch System (CTCSS) sub-audible tone.

4. The method of claim 1, wherein the squelch code comprises a Digital Coded Squelch (DCS) code word.

5. The method of claim 1, wherein the receiver is compatible with a Personal Radio Service.

6. The method of claim 5, wherein the Personal Radio Service is selected from a group consisting of 218-219 MHz service, a Citizens Band service, a Family Radio Service, a General Mobile Radio Service, a Low Power Radio Service, a Medical Implant Communications Service, and a Wireless Medical Telemetry Service.

7. A computer readable medium having stored thereon data representing instructions that, when executed by a processor of a receiver adapted to receive a first signal, cause the processor to perform operations comprising:
   detecting a squelch code in said first signal;
   enhancing a response of the receiver to said first signal in response to at least the squelch code by substantially nulling an interfering signal appearing on a same channel as the first signal; and
   spatial processing to determine a set of spatial processing weights using the squelch code and to combine the first signal according to the set of spatial processing weights;
   wherein the set of spatial processing weights is configured to represent at least one of a phase and amplitude adjustment of the first signal.

8. The computer readable medium of claim 7, wherein the instructions further cause the processor to combine the first signal according to the set of spatial processing weights to provide a combined signal related to the first signal.

9. The computer readable medium of claim 7, wherein squelch code comprises a Continuous Tone Coded Squelch System (CTCSS) sub-audible tone.

10. The computer readable medium of claim 7, wherein the squelch code comprises a Digital Coded Squelch (DCS) code word.

11. The computer readable medium of claim 7, wherein the receiver is compatible with a Personal Radio Service.

12. The computer readable medium of claim 11, wherein the Personal Radio Service is selected from a group consisting of 218-219 MHz service, a Citizens Band service, a Family Radio Service, a General Mobile Radio Service, a Low Power Radio Service, a Medical Implant Communications Service, and a Wireless Medical Telemetry Service.

13. A system comprising:
   a plurality of radios means capable of two-way communications, at least a first radio means including a plurality of antenna elements, said at least first radio means including:
   means for detecting a squelch code in a first signal;
   means for enhancing a response of the at least first radio to said first signal in response to at least the squelch code by substantially nulling an interfering signal appearing on a same channel as the first signal; and
   means for spatial processing adapted to determine a set of spatial processing weights using the squelch code and adapted to combine the first signal according to the set of spatial processing weights to provide a combined signal related to the first signal;
   wherein the set of spatial processing weights is configured to represent at least one of a phase and amplitude adjustment of the first signal.

14. The system of claim 13, wherein squelch code comprises a Continuous Tone Coded Squelch System (CTCSS) sub-audible tone.

15. The system of claim 13, wherein the squelch code comprises a Digital Coded Squelch (DCS) code word.

16. The system of claim 13, wherein the receiver is compatible with a Personal Radio Service.

17. The system of claim 16, wherein the Personal Radio Service is selected from a group consisting of 218-219 MHz service, a Citizens Band service, a Family Radio Service, a General Mobile Radio Service, a Low Power Radio Service, a Medical Implant Communications Service, and a Wireless Medical Telemetry Service.

* * * * *

UNITED STATES PATENT AND TRADEMARK OFFICE
CERTIFICATE OF CORRECTION

PATENT NO.        : 7,395,042 B2                                           Page 1 of 1
APPLICATION NO.   : 11/469015
DATED             : July 1, 2008
INVENTOR(S)       : Lawrence Alder It is certified that error appears in the above-identified patent and that said Letters Patent is hereby corrected as shown below:

On the Title Pg Item (63), please delete "10/483,259" and insert --11/483,259--.

Signed and Sealed this

Twenty-seventh Day of July, 2010

David J. Kappos
*Director of the United States Patent and Trademark Office*